No. 742,340. PATENTED OCT. 27, 1903.
F. J. MACHALSKE.
PROCESS OF PRODUCING CHLORIDS OF CARBON.
APPLICATION FILED JUNE 18, 1903.
NO MODEL.
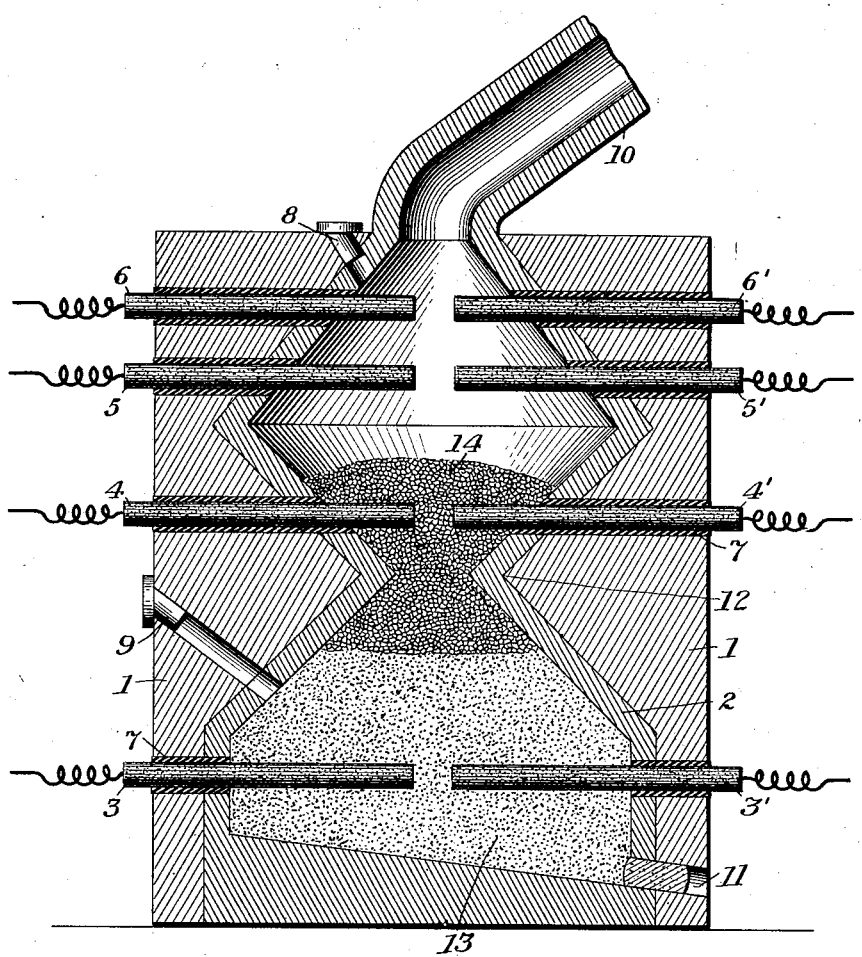
Witnesses
R A Balderson
J. B. Hill
Inventor
Florentine Joseph Machalske
By Dyrkes & Townsend
Attorneys.

No. 742,340.                                                          Patented October 27, 1903.

UNITED STATES PATENT OFFICE.

FLORENTINE JOSEPH MACHALSKE, OF BROOKLYN, NEW YORK, ASSIGNOR OF ONE-HALF TO CHARLES HERBERT LYON, OF CHICAGO, ILLINOIS.

PROCESS OF PRODUCING CHLORIDS OF CARBON.

SPECIFICATION forming part of Letters Patent No. 742,340, dated October 27, 1903.

Application filed June 18, 1903. Serial No. 162,106. (No specimens.)

*To all whom it may concern:*

Be it known that I, FLORENTINE JOSEPH MACHALSKE, a citizen of the United States, residing at Brooklyn, in the county of Kings and State of New York, have invented certain new and useful Improvements in Processes of Producing Chlorids of Carbon, of which the following is a specification.

According to this process a porous mass of broken carbon, such as coke, is heated to incandescence, preferably by means of an electric current, and chlorin is brought in contact with the heated carbon, combining therewith to form chlorids of carbon. The chlorin may be produced in any well-known way, as by the electrolysis of a chlorin compound, such as sodium chlorid, either molten or in aqueous solution. The preferred mode of operation consists in charging a mixture of sodium chlorid and silica sand into the lower part of an electric furnace, then charging broken coke upon the mixture, and simultaneously heating the mixture and the coke to a high temperature by means of electric currents passing through the charge and through the furnace-chamber above the charge. The sodium chlorid thereupon melts and the silica dissolves in the molten chlorid, liberating chlorin, which rises through the incandescent coke and combines with it to produce the carbon chlorids, which are carried to a condenser or chamber. The charge should be free from water, and a non-oxidizing atmosphere should be maintained in the furnace. Various chlorids of carbon may be produced by varying the proportions of the ingredients of the charge or by varying the number of electric arcs in the furnace-chamber above the charge.

A suitable furnace for carrying out the process is shown in the accompanying drawing, in which the figure is a vertical axial section. It is to be understood that this furnace is merely illustrative and that the process is in no way limited to its use.

The furnace shown comprises a stack 1, of refractory non-conducting material, such as fire-brick, with a lining 2 of magnesia brick. Several superposed pairs of carbon electrodes 3 3', 4 4', 5 5', 6 6' pass adjustably through refractory non-conducting sleeves 7 in the sides of the furnace. Charging-openings 8 9, with suitable closures, pass through the top and side walls. An outlet-flue 10 for the carbon chlorids extends from the upper end of the furnace. A tap-hole 11 leads from the lower part of the furnace-chamber. The working chamber is contracted at its middle portion 12.

According to the preferred mode of operation a charge 13, consisting of a water-free mixture of pure silica sand and sodium chlorid, is introduced into the lower part of the furnace, so as to surround the ends of the lower electrodes 3 3'. A body of water-free broken coke 14 is charged upon the mixture 13 and around the ends of the intermediate electrodes 4 4'. An electric current is then passed between the electrodes 3 3' and 4 4', heating the mixture 13 to a temperature sufficient to melt the sodium chlorid and bringing the coke to incandescence. The silica dissolves in and reacts with the sodium chlorid to liberate chlorin, which rises through and combines with the incandescent coke, producing carbon chlorids, which are delivered through the outlet-flue 10 to a condenser or chamber. The molten residue is withdrawn through the tap-hole. Air should be excluded from the furnace and chamber during the operation. The temperature requisite for the reaction is somewhat below 2,000° centigrade. An electric current of five hundred amperes at a potential difference of sixty volts is sufficient for a furnace of the usual size.

Various chlorids of carbon may be produced by varying the proportions of the ingredients of the charge. Typical reactions may be represented by the following equations:

(1.) $4NaCl + 2SiO_2 + C = CCl_4 + Si(ONa)_4 + Si$.

(2.) $6NaCl + 2SiO_2 + 4C =$
$\quad\quad\quad C_2Cl_4 + C_2Cl_2 + [Si(ONa)_4 + Na_2Si]$.

(3.) $6NaCl + 3SiO_2 + 2C =$
$\quad\quad\quad C_2Cl_6 + [2(SiNa_2O_3) + Na_2Si]$.

Sulfur chlorid may be produced simultaneously with the carbon chlorids by adding sulfur to the charge. A typical reaction in this case may be represented by the following equation:

(4.) $6NaCl + 2SiO_2 + C + 2S = CCl_4 + S_2Cl_2 + [Si(ONa)_4 + Na_2Si]$.

It will be seen from these reactions that the silica serves to bind the base of the chlorin compound. The salt or other chlorin compound may, however, be used without the silica. The salt charged around the lower electrodes of the furnace may be melted and electrolyzed by a direct current passing between the electrodes or dissociated by an alternating current to liberate chlorin. The chlorin compound and the silica and sulfur, if used, may be mixed directly with the coke or other carbonaceous matter and the mixture charged into this furnace or one of any usual type. The reactions and the nature of the product, as dependent upon the proportions of the ingredients, will be similar to those already described.

The carbon chlorid or the mixture of carbon chlorids produced by the reactions between the ingredients of the charge may be modified as they escape through the upper portion of the furnace-chamber to the outlet-flue 10 by passing them through one or more electric arcs sprung between the carbon electrodes 5 5' and 6 6'. The action here consists in a reduction of the original chlorid or chlorids to a lower form. Assuming that the chlorid escaping from the charge and passing through the electric arcs is the tetrachlorid, typical reactions may be represented by the following equations:

(a.) $CCl_4 + C_3 = 2C_2Cl_2$.

(b.) $CCl_4 + C = C_2Cl_4$.

If any uncombined chlorin rises from the charge in admixture with the carbon tetrachlorid, typical reactions produced in the mixture by the action of the arcs may be expressed as follows:

(c.) $CCl_4 + C + 2Cl = C_2Cl_6$.

(d.) $2CCl_4 + 2C_2 + 2Cl = 2CCl_3 + (C_2Cl_2)_2$.

(e.) $CCl_4 + 5C + 2Cl = C_6Cl_6$.

(f.) $CCl_4 + 2C + 4Cl = C_3Cl_8$.

It will thus be seen that the nature of the reactions and resulting chlorids may be widely varied at the discretion of the operator by varying the charge and the number or intensity of the electric arcs to which the gaseous product rising from the charge is subjected.

No claim is made in this case to the specific process in which the carbonaceous substance is mixed with the chlorin compound and silica, this invention constituting the subject-matter of my previous application, Serial No. 124,653, filed September 24, 1902.

I claim—

1. The process of producing chlorids of carbon, which consists in electrically heating a mass of carbon to a temperature sufficient to effect the reaction and bringing chlorin into contact with the heated carbon, as set forth.

2. The process of producing chlorids of carbon, which consists in heating a mass of carbon to a temperature sufficient to effect the reaction and passing chlorin through the heated mass, as set forth.

3. The process of producing chlorids of carbon, which consists in electrically heating a mass of carbon to a temperature sufficient to effect the reaction and passing chlorin through the heated mass, as set forth.

4. The process of producing chlorids of carbon, which consists in heating a carbonaceous substance and a chlorin compound to a temperature sufficient to effect the reaction, as set forth.

5. The process of producing chlorids of carbon, which consists in heating carbon to a temperature sufficient to effect the reaction, decomposing a chlorin compound and bringing the chlorin into contact with the heated carbon, as set forth.

6. The process of producing chlorids of carbon, which consists in decomposing a chlorin compound in the presence of a reagent which will combine with the base of the compound, and bringing the chlorin into contact with carbon heated to a temperature sufficient to effect the reaction, as set forth.

7. The process of producing chlorids of carbon, which consists in heating a carbonaceous substance, an alkali chlorid and silica to a temperature sufficient to effect the reaction, as set forth.

8. The process of simultaneously producing chlorids of carbon and sulfur, which consists in bringing chlorin into contact with carbon and sulfur at a temperature sufficient to effect the reaction, as set forth.

9. The process of simultaneously producing chlorids of carbon and sulfur, which consists in heating carbon, sulfur and a chlorin compound to a temperature sufficient to effect the reaction, as set forth.

10. The process of producing chlorids of carbon, which consists in placing a mass of broken carbon on a body containing a chlorin compound, heating said mass and body, and liberating chlorin from its compound and causing it to pass through the heated carbon at a temperature sufficient to effect the reaction, as set forth.

11. The process of producing chlorids of carbon, which consists in placing a mass of broken carbon on a body containing a chlorin compound, electrically heating said mass and body, and liberating chlorin from its compound and causing it to pass through the heated carbon at a temperature sufficient to effect the reaction, as set forth.

12. The process of producing chlorids of carbon, which consists in charging a mass of broken carbon on a mixture of an alkali chlorid and silica, passing an electric current through said carbon and thereby heating it to incandescence, passing an electric current through said mixture and thereby liberating chlorin, and passing the chlorin through the heated masses of carbon at a temperature sufficient to effect the reaction, as set forth.

13. The process of producing chlorids of carbon, which consists in liberating chlorin from a chlorin compound in the presence of carbon heated to a temperature sufficient to effect the reaction, as set forth.

14. The process of producing chlorids of carbon, which consists in freeing chlorin from one of its compounds in the presence of carbon and a reagent which will combine with another element of the compound, and heating the carbon to a temperature sufficient to cause it to combine with the chlorin, as set forth.

15. The process of producing chlorids of carbon, which consists in bringing chlorin into contact with carbon at a temperature sufficient to produce a carbon chlorid or mixture of carbon chlorids, and subsequently passing said chlorid or mixture of chlorids through an electric arc, as set forth.

In testimony whereof I have affixed my signature in presence of two witnesses.

FLORENTINE JOSEPH MACHALSKE.

Witnesses:
AUG. E. GRIP,
ROGER C. ALDRICH.